United States Patent [19]

Hieber

[11] 3,875,303

[45] Apr. 1, 1975

[54] PREPARATION OF BEER

[75] Inventor: Josef Hieber, East Northport, N.Y.

[73] Assignee: Interbrew Betriebs- und Beteilgungs - AG, Solothurn, Switzerland

[22] Filed: Nov. 29, 1973

[21] Appl. No.: 420,165

Related U.S. Application Data

[63] Continuation of Ser. No. 240,977, April 4, 1972, abandoned, which is a continuation-in-part of Ser. No. 883,669, Dec. 22, 1969, abandoned, which is a continuation of Ser. No. 523,066, Jan. 26, 1966, abandoned.

[30] Foreign Application Priority Data

Jan. 28, 1967  Switzerland.................. 1221/65

[52] U.S. Cl................ 426/16, 99/276, 99/277.1, 426/11, 426/64, 426/223, 426/422, 426/519
[51] Int. Cl.............................................. C12c 11/04
[58] Field of Search............. 426/11, 16, 28, 29, 64, 426/519, 349, 223; 99/276, 277, 277.1, 277.2

[56] References Cited

UNITED STATES PATENTS

| | | | |
|---|---|---|---|
| 2,818,341 | 12/1957 | Niemann | 426/519 X |
| 3,290,153 | 12/1966 | Bayne et al. | 426/349 |
| 3,345,179 | 10/1967 | Pollock et al. | 426/16 |
| 3,361,569 | 1/1968 | Malick | 426/16 |

OTHER PUBLICATIONS

J. De Clerck, A Textbook of Brewing, Vol One, Chapman and Hall Ltd., London, 1957, (pp. 71, 79–90, 284, 299, 302, 303, 333, 352, 428–438, 445 & 446).

*Primary Examiner*—David M. Naff

[57] ABSTRACT

Beer is produced from a wort concentrate by a process involving sterilizing and desalting water, providing the sterilized and desalted water with a controlled salt content, dissolving a wort concentrate having at least 80% dry substance content in the water and fermenting with yeast to produce beer. The wort concentrate is dissolved in the water with a jet mixer and fermentation is carried out in a vessel containing a cooling chamber located above a centrifuge drum having therein plates for separating yeast and an impeller for circulating wort.

13 Claims, 8 Drawing Figures

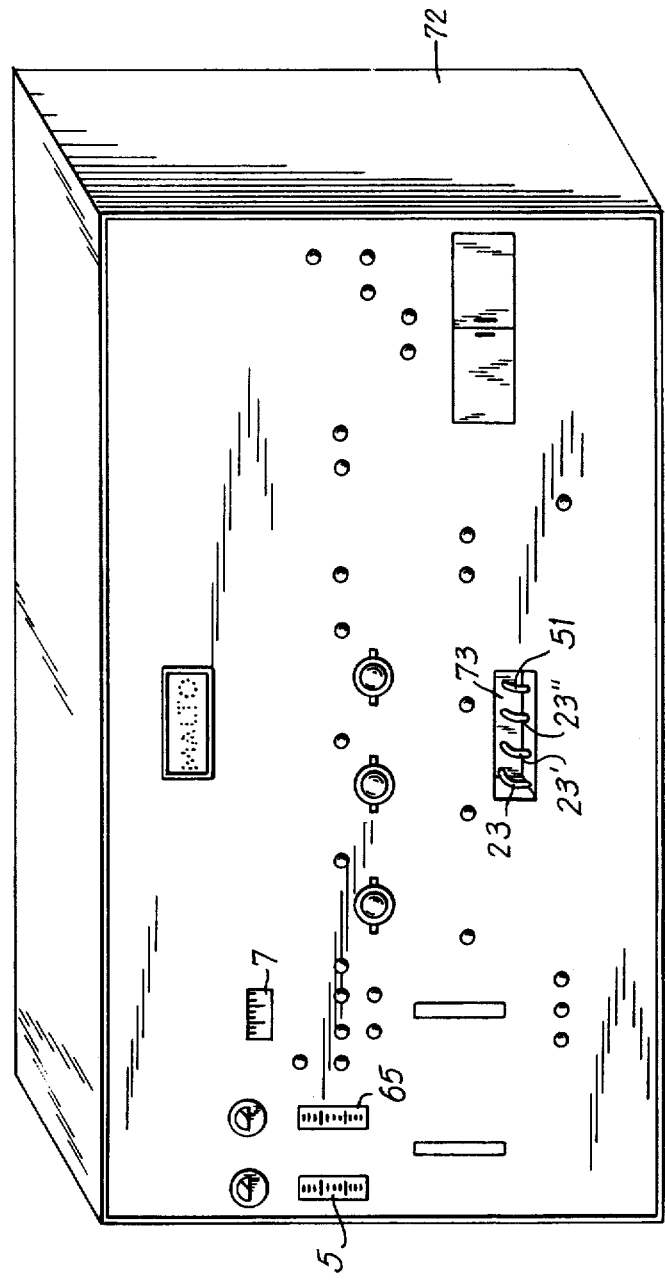

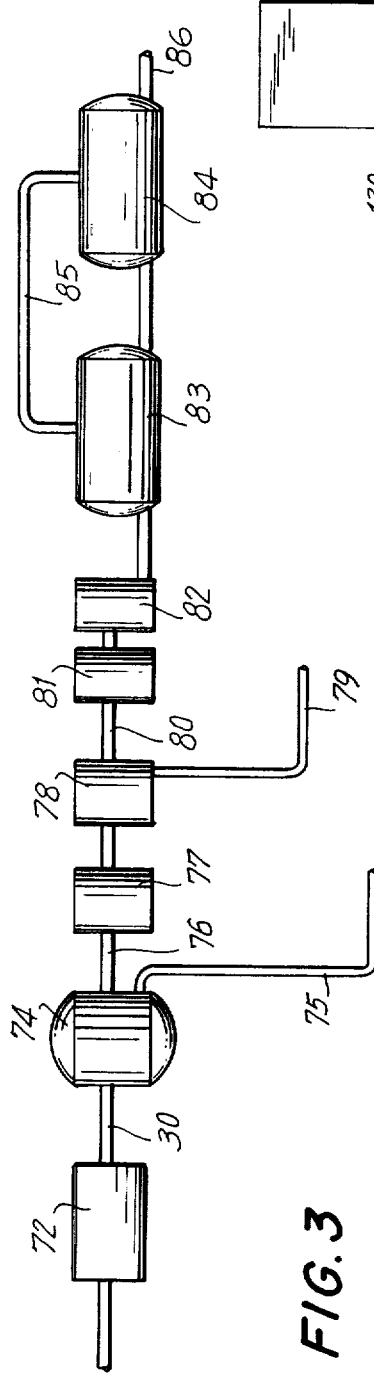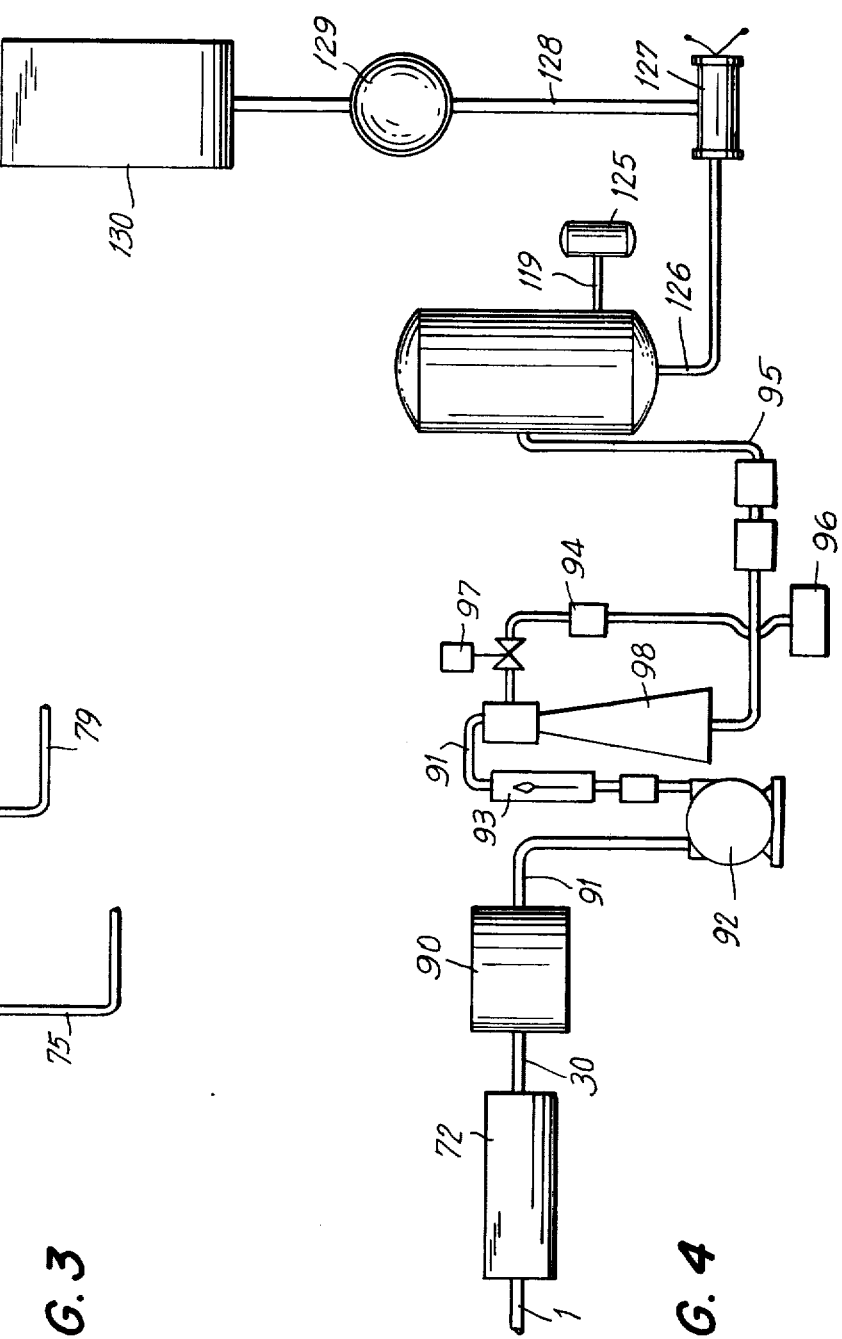
FIG. 3
FIG. 4

3,875,303

PREPARATION OF BEER

CROSS RELATED APPLICATION

This application is a continuation of co-pending application Ser. No. 240,977 filed Apr. 4, 1972 (now abandoned) which is a continuation-in-part of application Ser. No. 883,669 filed Dec. 22, 1969 (now abandoned) which in turn was a continuation of Ser. No. 523,066 filed Jan. 26, 1966 (now abandoned) and claiming the priority of my application filed in Switzerland on Jan. 28, 1965.

BACKGROUND OF THE INVENTION a. Field of the Invention

This invention relates to the production of beer and the like.

b. Prior Art

In the conventional production of beer, grain (specifically barley) is transformed into malt by the so-called malting process, or else, the malt is treated with water to form a mash. The mash extract separated from the solids is mixed with hops or hop-extract and the resulting wort is fermented by means of beer or brewer's yeast.

The malting and brewing apparatus required for the production of beer are very large and, therefore, require large buildings capable of accommodating a great number of machines, apparatus, storage facilities for the starting materials, storage cellars, and so forth. For this reason, breweries and malt houses are erected at a site near which the grain and the hops required for the production of beer either are harvested or where transport facilities are available. In addition, it is essential that the water at the site of the brewery is suitable for the production of beer.

Another disadvantage of the conventional method of producing beer resides in the long treatment times which are required for malting and fermentation as well as for the aging or mellowing of the fresh beer. The erection of a brewery therefore requires large capital investments.

SUMMARY OF THE INVENTION

It is an object of the present invention to accelerate the production of beer while using conventional raw materials, the only ones allowed to be used in different countries, and to shorten the time of production to several days, for example to not more than about 13 days, and preferably to 5 to 6 days or less.

It is another object of the invention to reduce expenses connected with the building of conventional breweries.

It is still another object of the invention to reduce the expenses connected with the transportion of beer which, as is known, consists of 80 to 90% water, and to make the erection of a brewery independent of the geographic presence of the raw materials, especially grain, and specifically barley and hops.

Still another object of the invention consists in creating a method which makes the preparation of beer independent of the quality of the water avilable at the site of the brewery, and which makes it possible to produce, at any desired location, beer of any type desired, for example, beer of the Pilsen kind, of the Bavarian kind, or of the Scottish, English or French types.

An essential principle of the invention consists in locally separating the production of the beer wort, on the one hand, from its attenuation or fermentation to beer, on the other. It has already been proposed to concentrate wort obtained from barley and hops by malting, mashing and treatment with hops and to ferment the concentrate wort at a different location. However, this method is complicated; above all, it does not offer the possibility of producing a beer of the desired quality and of the desired type at any place with any kind of water for brewing.

The present invention solves the above-described problems in that a concentrate of a wort having at least 80% dry substance, which may be produced at a site favorable for the treatment of grain and hops, is dissolved in water which, having been freed from salt and sterilized is adjusted to the desired salt content and the resulting wort is attenuated with fermenting yeast at low temperature under pressure whereafter the resulting beer is decanted after aging.

The process according to the invention can be carried out at any site whatsoever, for the wort concentrate largely freed of water can be shipped at comparatively low cost; moveover, it is also possible to use the water available at any specific site, since the water is first freed completely of salts, like a distilled water, for example, by contact with a cation exchanger and subsequently with an anion exchanger and is subsequently, or previously rendered completely clear by means of chlorine, a sodium hypochlorite solution or ozone, and is similar to distilled water, it can then, for example, by the addition of calcium chloride and/or sodium bicarbonate in the desired dosage, be adjusted to the character of a water for brewing, such as is required for the type of beer desired.

In order to accelerate the process, the wort concentrate is preferably added to the water adjusted to the desired salt content by means of a dosing or proportioning pump and the mixture is then boiled while stirring until the concentrate has dissolved completely, whereupon the wort is cooled and the yeast is added. It is expedient to use, for the process of the invention, a wort concentrate which is obtained by mashing barley malt, according to the decoction or infusion process, by the subsequent addition of hops or hop-extract, by filtering and concentrating under exclusion of air to at least 80% and which is then racked or decanted under exclusion of air. It is especially expedient to use a wort concentrate, during whose production the mash is mixed, after clarification, in boiling state, with hops and hop-extract, is boiled for another 60 to 90 minutes, is clarified by means of a sediment centrifuge, cooled on a plate-cooler, filtered with silicic acid being added and concentrated in a vacuum geyser (hot water apparatus). However, it is a special feature of the present invention that the production of said wort can be carried out independently and locally, completely separate from the attenuation to beer, so that the brewery may be of very small size and can be erected with small investment costs.

In order to be able to produce beer in the brewery, in the simplest possible manner, from the concentrate supplied, it may be expedient to dispense with the use of boiling for dissolving the wort, because the boiling process is lengthy and therefore requires large containers. On the other hand, the fermentation process can be accelerated by the use of pressure during the fermentation.

In a special embodiment of the invention, the wort concentrate is dosed with running water by a nozzle after being heated to a temperature of 40°–45°C., and the resulting mixture is transformed without further heating into a solution in a closed container with an intensely acting jet mixing apparatus of the type known as "Ferment-O-Start-L", manufactured by the firm Fullpack of Dusseldorf, Germany. The wort dissolved in this manner is mixed with yeast in a container and is subjected to an initial fermentation without pressure, and the partly attenuated wort is then completely attenuated under pressure in a fermentation pressure tank, whereupon the beer is aged.

The wort concentrate thickened to at least 80% dry substance has an extremely high viscosity and the special properties that, when stirred in a conventional stirring apparatus, it forms filaments which wind about the blades and the shaft of the stirrer and, therefore, dissolve only slowly. It would therefore appear necessary first to carry out the dissolution by boiling. However, it is another object of the invention further to simplify the brewing plant and further to reduce the size of the plant, more particularly, to dispense with the dissolution by boiling, which requires periodic operation, and also further to reduce the expenditures required for the inoculation with yeast, for the fermentation and aging. It has been found, surprisingly, that it is possible to dissolve the viscous and ropy or stringy wort concentration while cold and continuously, if the dissolution is carried out in a special manner. This can be done by means of the afore-mentioned jet mixing apparatus, which will be described in greater detail later. This mixture is herein transformed into a solution without heating, whereupon said solution is then fed to the fermentation plant.

Since the jet mixing apparatus causes the complete dissolution of the wort concentrate within a few seconds, the necessary devices can be built into the feed pipes for the fermenting container and can be flown through continuously. Moreover, the necessity of cooling the wort from the boiling temperature to the fermenting temperature is dispensed with and, in the preferred execution of the fermentation in a cooling container, the entire fermentation or attenuation can be carried out in about one to two days. If two or more such cooling fermenting containers are arranged in parallel, the flow through the comminuting and mixing device can continue uninterruptedly during the entire period of operation, so as to charge the fermenting containers successively.

The duration of fermentation can be influenced by the adjustment of high yeast concentration, and the desired temperatures for fermentation and storing can be adjusted accurately by automatic measuring devices, if required, with time relays. Since the process, until the beer reaches the bottle filling or racking plant, is carried out in closed pipes and vessels under a carbondioxide atmosphere, the biological safety is increased.

In order to obtain as rapid a fermentation as possible, the dissolved wort is intensely mixed and fermented with precisely dosed amounts of yeast and air in the jet mixing apparatus of the Ferment-O-Start-L system at a temperature of, for instance, 5°C.

After the fermentation is completed, the yeast is separated from the beer by centrifugal force in the fermenting container. During the fermentation, yeast which has fermented, for example, up to 50 to 60% of the extract, is separated by centrifugal force and is replaced with new or refreshed yeast. The separation of the yeast is initiated while a portion of the extract, for example, 10 to 20% is still unfermented, and the fermentation is completed during the separation of the yeast.

After the yeast has been separated, the beer is cooled in the fermentation storage container to minus 1.5° to minus 2.5°C. and is kept at said temperature for one to two days. The circulation of the wort or of the new beer in the fermentation container is expediently carried out in several stages in such a manner that the circulating or stirring apparatus is operated at a low speed of, for example, 500 rpm. during the fermentation, that the separation of the yeast from the beer takes place at a medium speed of, for example, 2000 to 3000 rpm. and that, shortly before the storing of the beer is completed, the beer is preclarified or completely clarified at the highest speed. If the separation of the yeast is carried out in the fermenting vessel, it is expedient to add to the beer in the fermenting vessel separating agents such as, for example, kieselguhr, to facilitate separation of the yeast and clarification.

An essential constituent of a brewery plant according to the invention is the preparing or treatment plant for the water for brewing, which makes it possible to carry out a degermination, for example, chlorination, and then the removal of the excess sterilizing agent, for example, dechlorination, whereupon the sterile water is completely free of salts, since the wort already contains the salts which are required for the kind of beer in question. These treatment stages are comprised in a constructional unit consisting expediently of a case which encloses all storage containers, treatment vessels, pipings and valves and which comprises on its exterior substantially only operating handles for the valves, sight glasses for observing the state of filling and taps for the removal of sterile water, of ready-for-use liquor (water for brewing). The preparing or treatment plant is also provided with a warning or alarm device which emits an optical or acoustic signal upon the exhaustion of one of the devices for dechlorination, cation exchange and/or anion exchange, in order automatically to stop the inflow of untreated water.

Several embodiments of the process according to the invention and of the apparatus expediently used for said process are illustrated in the accompanying drawing, without the invention's being limited thereto.

BRIEF DESCRIPTION OF THE DRAWING

FIG. 1 is a perspective view of a case of the water preparing or treatment plant;

FIG. 3 is the flow diagram of a process which dissolution of the wort concentrate by boiling and fermentation;

FIG. 4 is the flow chart for carrying out a brewing process by dissolution in the cold while using a special fermentation storage tank according to the invention;

DETAILED DESCRIPTION

Figure 2A:
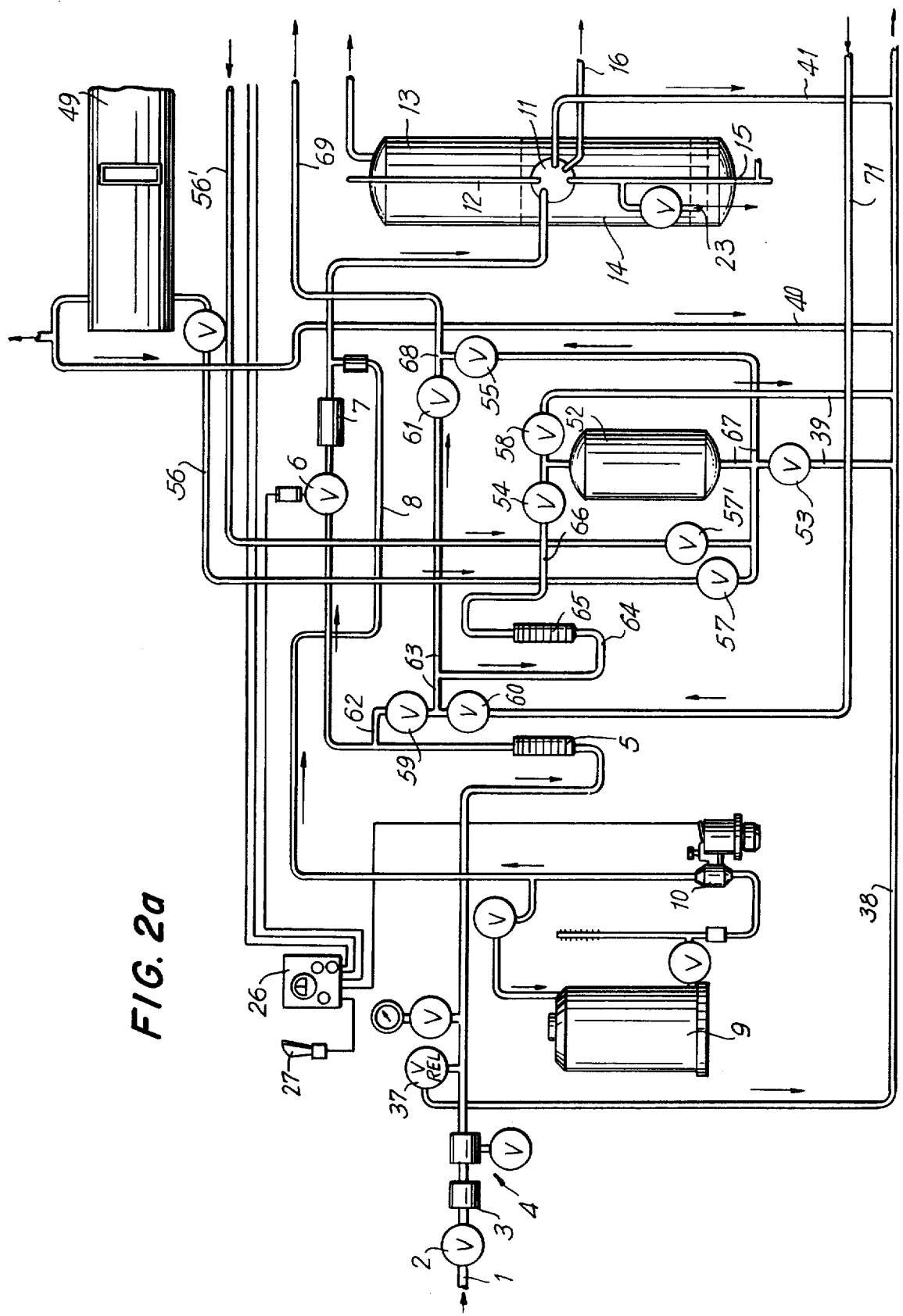
FIGS. 2a, 2b, and 2c are flow diagrams of the preparing plant according to FIG. 1.
Figure 2B:
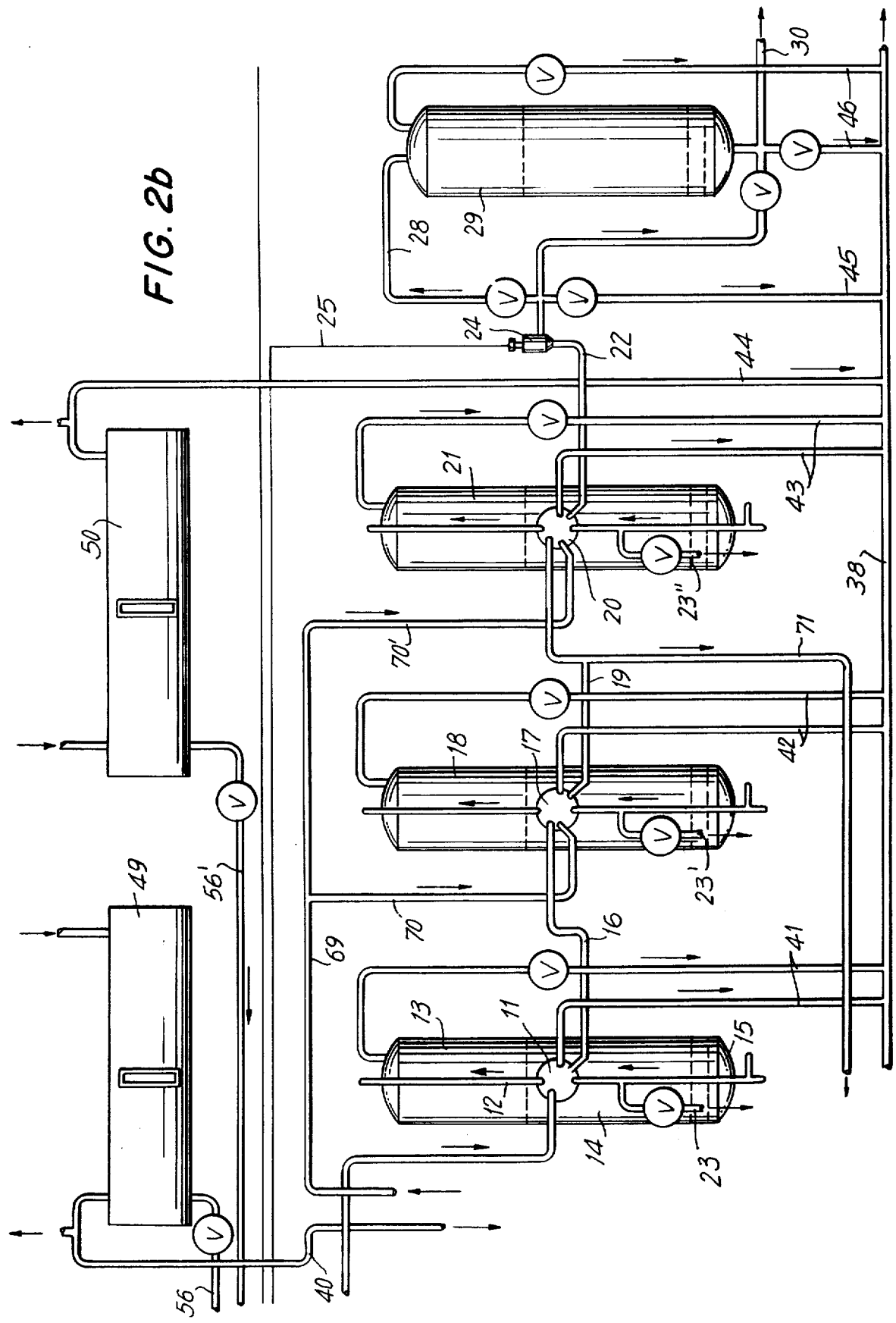
Figure 2C:
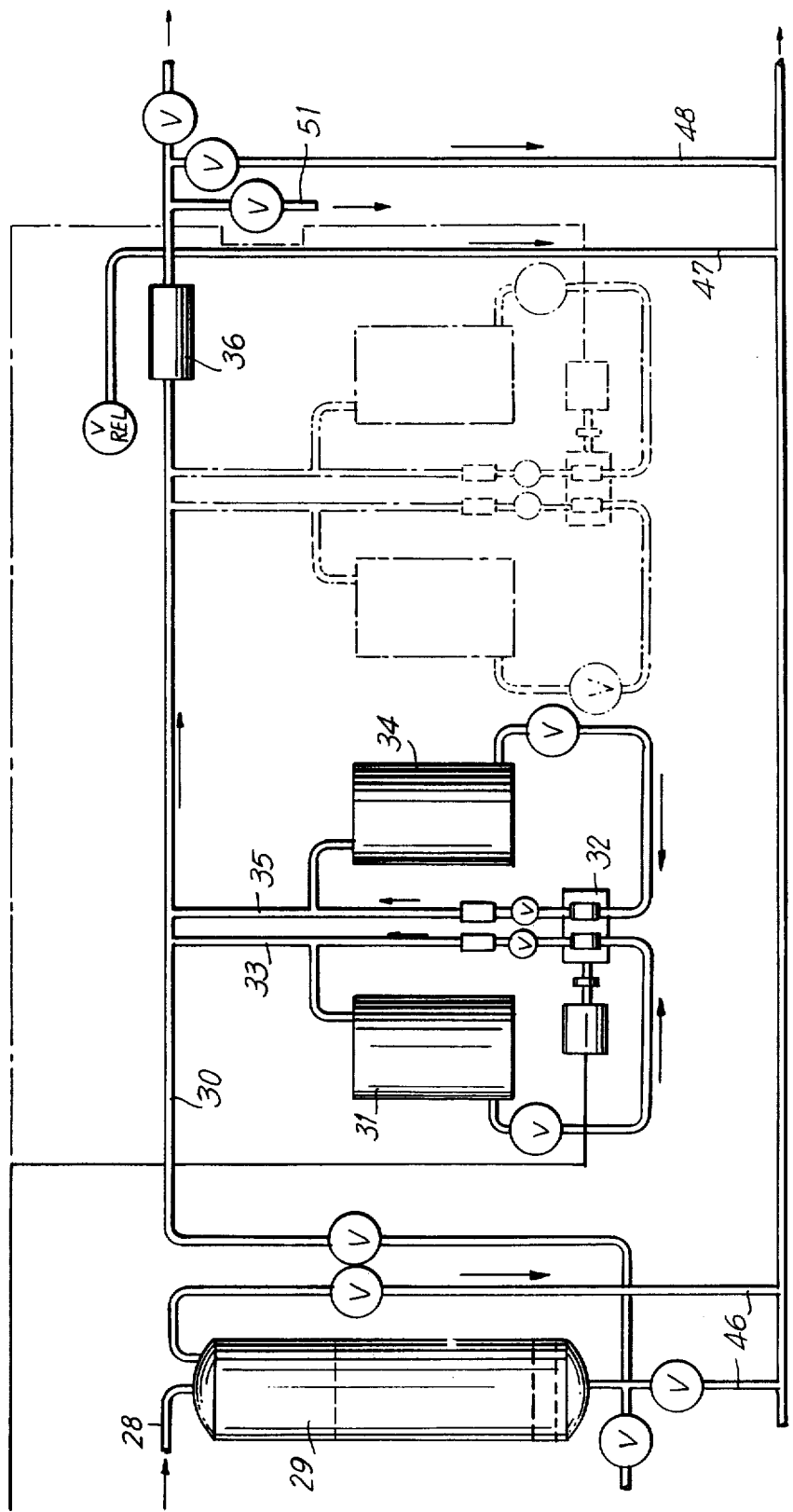

In the plant illustrated in FIGS. 2a, 2b and 2c, the preparation or treatment of water is carried out in the following manner:

The untreated water enters through piping or conduit 1 via main valve 2, and passes through the dirt interceptor 3 and the pressure-keeping valve 4. The untreated water flows through the main flow meter 5 and the magnetic valve 6 by way of the water meter 7 to the junction with the pipe 8.

From said pipe, a sodium hypochlorite solution of adjustable concentration is fed from the sodium hypochlorite container 9 by way of the proportioning or dosing pump 10. The untreated chlorinated water flows through the multiple valve apparatus 11 by way of the pipe 12 to the dechlorinating filter 13. This is laid out in such a manner that the residence time in the upper chamber above the charcoal or active carbon bed 14 is sufficient residence time required for the desired disinfection.

The dechlorinated water returns, through pipe 15, from the filter to the multiple valve apparatus 11 and flows through pipe 16 with an appropriate multiple valve apparatus 17 to the cation exchanger 18. Thence, the fully cleansed water flows through the pipe 19 by way of the multi-valve apparatus 20 into the anion exchanger 21. The fully desalted water is withdrawn through pipe 22. Branching off at the outlet pipes of the dechlorinating filter and of the cation and anion exchanger are the tapping or draining pipes 23, 23' and 23" which are provided with valves and which lead out of the enclosure, in order to make it possible to take samples, when required; from the stream of water and thereby to examine the functioning of the various stages.

Connected into the pipe 22 is a conductivity transmitter 24 which, upon a conductivity of, for example, 20 microohms being reached, transmits a pulse through the electric line 25 to the conductivity device 26. Said device is such that, on the one hand, it releases an optical and/or acoustic signal 27 and, on the other hand, shuts off additional supply of water by closing the magnetic valve 6. In addition, the measuring device 26 shuts of all proportioning pumps of the plant.

Having passed through the transmitter 24, the water passes through pipe 28 to the fining or clarifying filter 29 which absorbs possibly existing aromatic substances originating from the ion exchanger plant. For example, the water may contain a filling or charge of hydraffin or, quite generally, special active carbon. The water then flows through pipe 30. A calcium chloride solution is fed from the storage container 31 through the proportioning pump 32 and piping 33 to the water flowing through pipe 30. A similar storage container 34 contains a sodium bicarbonate solution which is fed to the water by the second of the twin pump 32 by way of the piping 35. As indicated in the drawing in chain dotted outline, additional proportioning or dosing devices for additional minerals, aromatic substances, sugar or the like may be provided, if required or desired. Connected at the outlet or drain pipe 30 is a mixer 36 to insure an unobjectionable and thorough mixing of the added substances. Preferably, however, no new salts are added to the fully desalted water, since the required salts are included in the wort concentrate.

If the pressure of untreated water is too great, the safety valve 37 allows the water to flow out through the collecting pipe 38. Connected to said collecting pipe are, in addition, the upper and lower discharge pipe 39 of regenerating vessel 52 (to be described hereinafter), the overflow pipe 40 of the HCL storage container 49, the discharge and air vent pipes 41, 42 and 43 of the three filters, the overflow pipe 44 of the NaOH storage container 50, the wash water discharge pipe 45 for the ion exchangers, the discharge and vent pipes 46 of the fining filter, and the excess pressure safety pipe 47 with built-in pressure relief valve. Arranged beyond the mixer 36, on the mash liquor pipe, is a branch pipe 51 provided with a valve, which makes it possible to test the finished mash liquor. A connecting pipe 48 between the mash liquor pipe 30 and the waste water pipe 38 is provided in order to conduct useless mash liquor to the drain.

The regeneration of the ion exchangers 18 and 20 is effected according to hydrostatic principles. When the valves 53 and 54 and 55 are closed, hydrochloric acid is allowed to enter the regenerating vessel 52 (filled with water) from the bottom through the open valve 57. During this operation, water is displaced (expelled) by way of the valve 58 and the piping 39. After the desired amount of hydrochloric acid has been inserted into the vessel 52, the valves 57, 58 are closed, valve 59 is opened, valve 60 is closed, and valve 61 is opened. Since the magnetic valve 6 is closed, the untreated water closes piping 62 and valve 59 in the piping 63; a partial stream, whose magnitude can be adjusted by the valve 61, flows through piping 64, by way of the flow meter 65, piping 66, valve 54, from the top into the regenerating vessel 52 and presses the concentrated chemical, which is present in the lower portion of the container, by way of the piping 67 and the valve 55 into the piping 63 beyond the valve 61, so that the concentrated chemical is mixed, at the mixing point 68, to the dilution required for the regeneration. The dilute hydrochloric acid flows from the mixing point 68, by way of the pipings 69 and 70, to the cation exchanger 18 and flows out by way of the multi-valve apparatus 17 and the pipings 42. After regeneration is completed, the exchanger 18 is washed out in that untreated water is allowed to flow through the pipings 62, 63, 64, 66, 67, 69, 70 by way of the multi-valve apparatus 17 through the filter 18 and the drain pipes 42.

Analogously, the regeneration of the anion exchanger 21 is effected by means of caustic soda solution from the container 50; the pipings 56' with valve 57' and piping 70' correspond to piping 56 with valve 57 and piping 70, and the vent 43 corresponds to the vent pipe 42. However, chemically cleansed water is required for regenerating the anion exchanger 21. Consequently, the valve 59 is closed, and cleansed water is introduced into the piping 63 from the piping 19 through the branch pipe 71 and the open valve 60.

FIG. 1 shows the case 72 which encloses the entire plant. The tap or drain pipes 23, 23', 23" and 51 are visible in an opening or recess 73. In addition, flow meters, handwheels or other handles (knobs) of the valves are located on the front, but the pipings and containers are not directly accessible, so that they cannot be changed by unskilled persons. The above embodiments obtain the degermination or sterilization of untreated water with sodium hypochloride and the subsequent dechlorination; however, said sterilization may also be carried out, if desired, by a treatment with chlorine gas or with ozone or with any other sterilizing agent. It is also possible to carry out such a sterilization, specifically with ozone, only after complete removal of salt or after the clarification and even after the salts have been added or dosed, for example, from the containers 31 and 34.

FIG. 3 is a diagrammatic view of a plant for a brewing process according to the invention. The untreated water flows through piping 1 into the water treatment plant 72, and the regulated mash liquor flows through the piping 30 into the brewing boiler 74, in which the wort concentrate is added, in dosed amount, to the water via piping 75 from a supply thereof. The brewing boiler 74 is equipped with a stirring apparatus and a heating device, for example, a steam-heat superheater jacket, so that a wort of the desired extract concentration is obtained.

After the wort has been dissolved completely, it flows through the piping 76 to the cooler 77 and arrives, in cooled state, in the innoculating vat 78, into which the required brewer's yeast, preferably a special pressure yeast, is dosed in the proper proportion by way of the piping 79 from a supply thereof. The wort mixed with yeast can then be fed to a container 81 by means of piping 80; in said container, the wort can be treated by irradiation, for example, with ultrasonic or with radioactive rays. The wort then flows through the filter 82 to the fermentation tank 83 where it is attenuated or fermented under pressure. The fermenting process takes about 5 days. After the fermenting process is completed, the new beer is drawn off (racked) to the tank 84 wherein it is stored for about 7 days. It is understood that several storage tanks 84 arranged in parallel or in series may be used. The gas volumes of the fermentation tanks 83 and 84 are connected by a circulating pipe 85 for carbon dioxide. The finished beer is drawn off through piping 86 to a conventional racking plant.

As already mentioned above, another improvement of the process according to the invention consists in that the dissolution of the very viscous wort concentrate can be carried out without the use of heat and that the attenuation or fermentation can be carried out without using very high pressure, which results in an additional acceleration of the overall production of beer.

In this preferred embodiment, according to FIG. 4, the untreated water arriving through piping 1 is also completely freed of salt and degerminated in the treatment plant 72. The water flows through piping 30 into the storage container 90, and, thence, into a conveying pipe 91 with a pump 92 and flow meter 93, and into a jet mixing apparatus 98 of the type known as Ferment-O-Start-L. This jet mixing apparatus draws in the wort concentrate, pre-heated to 40°-45°C, from the container 96 via piping containing a washing device 94 and a dosing valve 97. The jet mixing apparatus produces a streak-free dissolution of the wort concentrate. The desired concentration is controlled by the valve 97.

The storage container 90 is expediently provided with several reaction chambers, in which the mash liquor is freed of any possible existing germs, shortly before it enters the piping system. This is particularly advantageous in geographic areas having a large amount of germs in the atmosphere.

Figure 5:
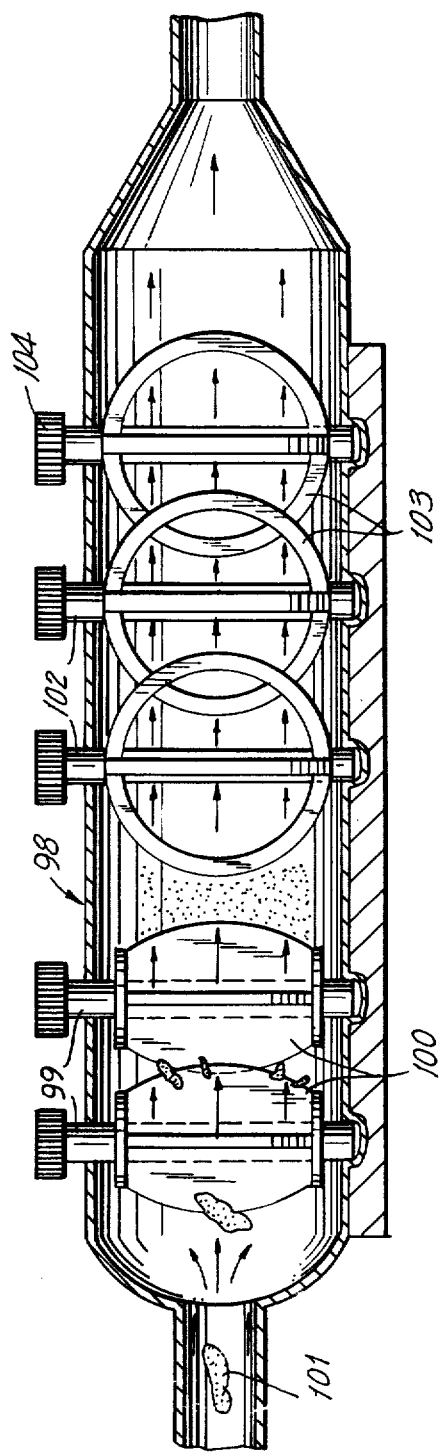
FIG. 5 is a sectional view of a mixing apparatus which is used in the process explained in FIG. 4.
Figure 6:
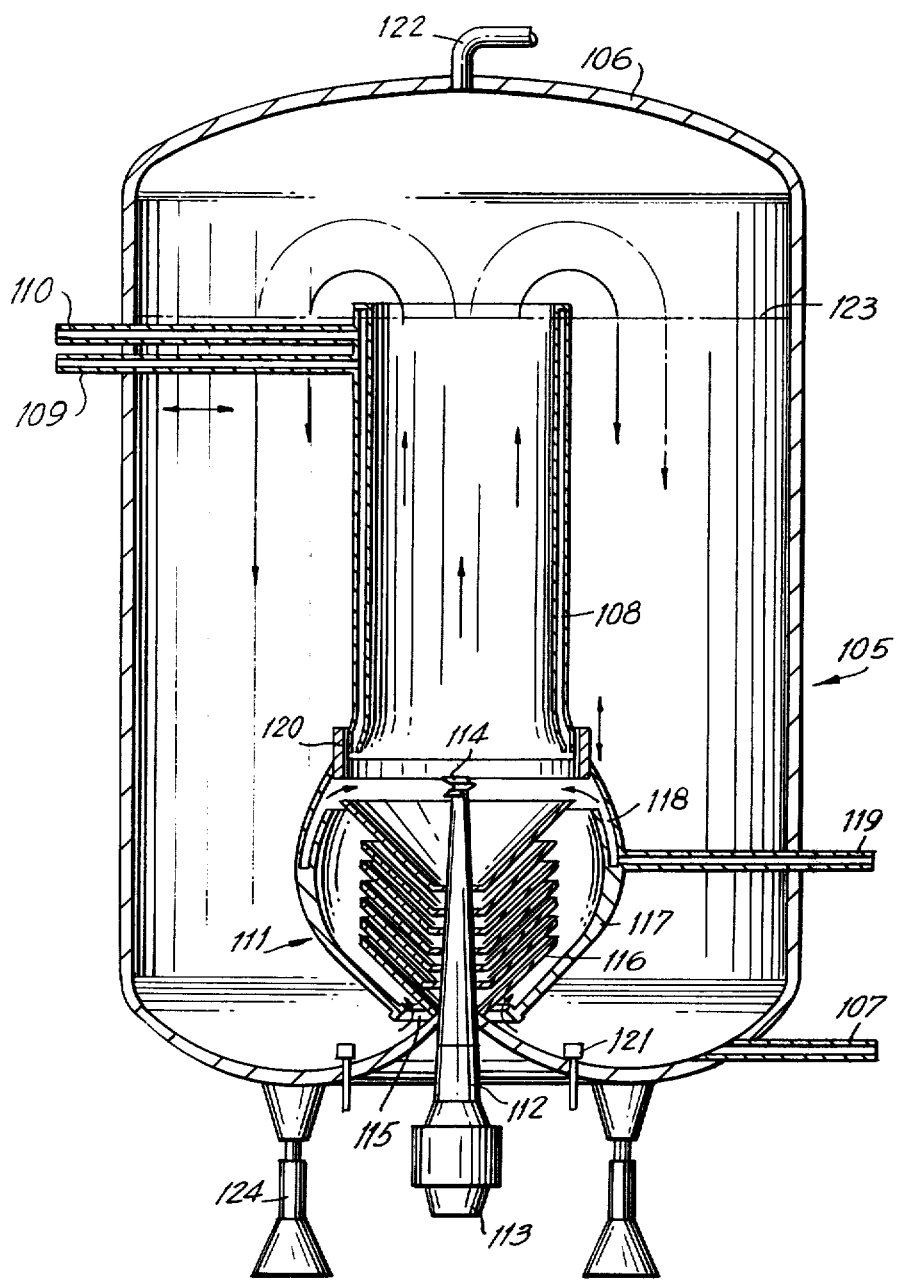
FIG. 6 is a longitudinal section through the fermentation storage tank according to the invention.

The dissolved wort is passed to the fermentation storage tank 105 by means of the pressure produced by the pump 92. The feed pump 92 is preferably so constructed that it is developed as high-speed stirrer with small sharp-edged stirring blades, thereby extensively distributing the inflowing extract in water. The transformation into a wort solution then takes place in the comminuting and mixing device 98. Said device 98 is illustrated in FIG. 5 on a larger scale. It has substantially the shape of a cylinder tapering at its ends, and wherein several comminuting and mixing tools are positioned transversely to the longitudinal axis thereof. Several, for example, four knife blades 100 which overlap slightly, are fixed axially parallel on the two parallel shafts 99. Said knives divide or shred the arriving filaments 101 of the wort concentrate into small wort particles in the manner indicated above, and the resulting mixture then arrives in the region of the stirring blades 103 fixed on the shafts 102. Said blades 103 also overlap in order to cause an extremely intense mixing and comminuting effect, so that the resulting product leaving at the right end of the container 98 is practically a wort solution. It is important that the comminuting-mixing process is carried out under complete exclusion of air. Admission of air would change the albumin or protein state of the wort and would result in a beer of a darker color. The tank 105 is preferably made of chrome nickel steel or of enameled sheet steel and shown in FIG. 6 on enlarged scale. It is fabricated in such a manner that it can be used for an operating pressure of 3 atmospheres. In order not to have to place the fermentation storage tank in a specially cooled room, it is completely surrounded with an insulating jacket 106. While the inlet to the fermentation storage tank 105 in the flow diagram of FIG. 4 is located approximately midways of the tank and the outlet at the bottom, an inlet and outlet opening 107 is located at the bottom of the tank in the preferred embodiment according to FIG. 6. An essential component of the container is the concentrically arranged double-walled cooling cylinder 108, whose coolant inlets 109 and 110 are indicated diagrammatically. The cooling jacket 108 is open at the top and bottom ends and is fixed in the interior of the container 105 by means of supports (not shown). Connected to the lower, slightly conically widened end of the cooling jacket is the drum 111 of a plate-type or peeling centrifuge. The driving shaft 112 of drum 111 is positioned, in a gas-tight and fluid-tight manner, axially in the container 105 within the centrifuge. A driving motor 113 is mounted on the end of said shaft, but the shaft may also be driven in any other manner. At its upper end, the shaft 112 carries an impeller worm or screw 114 which, when rotating, acts as a pump and circulates the wort, as indicated by arrows, in such a manner that it rises within the cooling jacket 108 and flows downwardly in the annular space between the cooling jacket and the container wall and then, passing through the space between the drum of the centrifuge and the wall of the container, enters the chamber of the centrifuge at the bottom. In addition to the impeller wheel 114, the plates 116 of the centrifuge are fixed on the shaft 112, so that the centrifuge is operated simultaneously.

A concentric, approximately cylindrical or frustoconical ring 117 is welded or fixed in any other manner to the centrifugal drum 111 approximately in the upper half thereof, so that an annular pocket 118 is formed between said ring 117 and the drum 111. An inlet and outlet pipe 119 with a valve (not shown) is connected to said pocket. Several, for example, two annular slide valves 120 are installed at the transistion point between the cooling cylinder 108 and the drum 111; in the position shown in the drawing, said annular slide valves seal off the intermediate space between the cooling jacket and the drum of the centrifuge, but they can be operated from the outside by means of a mechanism (not shown), so that they release the intermediate space between the cooling jacket and drum. For this purpose it is necessary to provide special sealing gaskets to withstand the high pressure and wear.

Built into the curved bottom of the container are several porous distributing nozzles 121 for introducing carbon dioxide and, if necessary, air, in finely divided state into the fermenting beer. Arranged at the cover of the container is a closable outlet opening 122 for air and carbon dioxide. The level of the wort, which shall expediently be maintained, is indicated by a broken line at 123. The entire container rests by means of supports 124 on the foundation of the building. These supports and, advisably, all other connections with external pipes, etc. are positioned in or covered with elastic material such as rubber or plastic, in order to avoid the transmission of vibrations.

The yeast is in the container 125 (shown in FIG. 4) which is connected to the drum of the centrifuge by way of the piping 119. The container 125 is expediently provided with a cooling jacket and carries an external insulation. In order to mix the yeast thoroughly, the container 125 may be provided with a stirrer (not shown). The size of the container 125 is adapted to the size of the fermentation storage tank and shall advisably have 10 to 15 percent of the volume of the latter. A pump for proportioning the yeast (not shown) is connected into the piping 119. By reversing said pump, the yeast can be withdrawn or conveyed into the fermentation storage tank. The container 125 contains the yeast suspended in beer at a temperature from about 0° to 1°C. under a carbon dioxide atmosphere.

The fermentation is carried out in the following manner:

The tank 105 is filled with wort to about 80% of its volume. By means of the cooling cylinder 108, the wort is quickly cooled to the desired brewing temperature, expediently to 8° to 10°C. By means of the nozzles 121, the wort is aerated from the bottom by control with a flow meter, which adjusts the amount of air to 30 to 50 ml. of air per liter of wort per hour.

The wort is pitched with approximately 1 liter of thick pasty yeast per hectoliter of wort which is introduced from the container 125 through the piping 119. During the pitching, the shaft 112 rotates at the lowest speed, for example, at 500 rpm. During this time, the annular slide valves 120 are open, so that there is a minimum resistance to the circulation of the wort. The liquid is pressed upwardly in the cooling cylinder substantially by centrifugal action and by the effect of the impeller wheel 114, flows over the upper edge of the cooling cylinder and flows downwardly in the outer space. In order to make the circulation as uniform as possible, baffles may be arranged at the upper end of the cooling cylinders when larger fermentation storage tanks are used.

A wort tank can also be used instead of a fermentation and storage tank 105 and the wort leaving this tank can be mixed with yeast and air by means of a jet mixing apparatus, similar to the Ferment-O-Start apparatus as previously described, and the mixture can be delivered to a conventional fermentation and storage tank in order to achieve fermentation. The wort is fed by a pump similar to 92 through a flow meter (similar to 93) into an injection jet apparatus (similar to 98), which draws in the yeast through a piping containing a washing device and dosing valve similar to 97, together with air and through an additional washing device and an air filter and a flow meter, producing a thorough mixture of wort, yeast and air which is then supplied to a conventional fermentation tank.

The beer is caused to move during the entire fermentation period which takes about 6 days. When 50 to 60% of the fermentable extract has been attenuated or fermented, two additional liters of thick pasty yeast are added per hectoliter of beer. Attenuation is then continued until it is completed. The difference between the output fermentation degree and end fermentation degree can be maintained at will. It is understood that it is possible to ferment briefly with a higher yeast concentration.

The yeast in the fermentation storage tank can be replaced, at any time, by fresh rested yeast of good fermenting power, so that the short fermentation time can be maintained at all times.

After the pitching period, the fermentation temperature is allowed to rise to 10° to 14°C. During the fermentation, the pressure in the tank rises to 1.5 to 1.6 atmospheres. Under these pressure and temperature conditions, the beer receives the amount of carbon dioxide which is necessary for racking.

The rise in pressure takes place expediently, in three states. In the first stage, up to 50% are attenuated under 0.4 atmospheres; in the second stage, at 1 atmosphere and in the third stage, at 1.6 atmospheres. However, if the carbon dioxide forming during the fermentation is to be recovered, the fermentation as a whole will be carried out at about 0.5 atmospheres, counterpressure. The purified carbon dioxide is then fed to the completely fermented and cooled beer by way of the distributing nozzles 121.

The yeast is removed from the beer after fermentation is completed, at the latest. However, said removal may be initiated when there is still a small percentage of fermentable extract which will be fermented while the yeast is separated from the beer. The extent of the fermentation, at which the separation of the yeast may be initiated, depends on the size of the fermenting vessel. As a general guideline, it may be stated that, for example, 10 to 20% of the extract are still unfermented when the separation of yeast is initiated.

Said separation is carried out by centrifuging. For this purpose, the annular slide valves 120 are inserted in the space between cooling jacket and centrifugal drum from the outside by a rod or lever system (not Shown), so that the wall is closed. Furthermore, the speed of the centrifuge is increased in this second stage, for example, to 2000 to 3000 rpm. The yeast now collects in the sludge pocket 118 and can be discharged after the valve in the piping 119 has been opened or after the proportioning pump provided in said piping has been reversed.

After the beer has been fermented completely, it is cooled within a short time to minus 1.5° to 2.5°C, by increase of the circulation of the coolant in the cooling jacket 108. Said temperature is maintained for one to two days, whereupon the beer is ready and is of unobjectionable quality. Prior to the withdrawal of the beer from the fermentation storage tank 105, another clarification is carried out by centrifuging. For this purpose, the centrifuge is switched to its maximum speed of rotation, for example, 5000 rpm (as already mentioned, the pressure in the second stage amounts to 1 atmosphere and in the third stage to 1.6 atmospheres).

The separation of the flocculated albumin (protein) and sediment portions during said aging of the beer can be further increased by the addition of adsorption agents such as kieselguhr, so that the beer will also be completely clarified during the third stage in the tank 105.

The drain pipe 126 leads to a filter 127 of a kind known per se, where the beer is freed of the centrifuged albumin (protein) and sediment portions, as well as of adsorption agents, if necessary. A degerminating filter may also be used at this place, if this is considered necessary. This after-filtration takes place completely smoothly, since the beer in the container 105 is under carbon dioxide pressure and a pump need, therefore, not be used. The beer flows from the filter 121 through piping 128 by way of a racking pressure tank 129 to the bottle filling (racking) plant 130.

After the fermentation storage tank 105 has been emptied it may be filled with wort immediately and pitched. The tank has to be cleaned only after prolonged intervals. If several tanks 105 are arranged in parallel, the filling and pitching of one or more tanks may be carried out while fermentation and separation are still taking place in another tank.

What is claimed is:

1. A process for the production of beer by dissolving a beer wort concentrate in water and attenuating the same with brewer's yeast, said process comprising sterilizing and desalting water; providing the sterilized and desalted water with a controlled salt content; dissolving wort concentrate having at least 80% dry substance in said water in the absence of external heating to obtain a fermentable wort, said dissolving of the wort concentrate in the water including the steps of pumping the water at a determinable rate and pressure in the form of a jet, and drawing the wort concentrate into the jet of water, by injection; fermenting said wort obtained from the jet with yeast at low temperature and under pressure, and aging and racking the resulting beer, said fermentating of the wort being effected in a closed vessel containing a cylindrical cooling chamber located above a centrifuge drum having plates therein for separating yeast and having an impeller therein for circulating wort, and including the steps of introducing dissolved wort into the vessel at the bottom thereof at least to partially fill said vessel, introducing the yeast into the centrifuge drum in the vessel, mixing the yeast and wort by rotating said impeller to circulate the wort upward through the interiors of the centrifuge drum and the cooling chamber and over the upper edge of the cooling chamber and downward through an outer space between the interior vessel wall and the outer walls of the centrifuge drum and the cooling chamber to the bottom of the vessel where the wort enters the bottom of the centrifuge drum to flow upward through the centrifuge drum and the cooling chamber, and removing yeast after fermentation from said vessel by centrifugation in said centrifuge drum by rotation of said plates.

2. A process according to claim 1 wherein the fermentable wort which has been added to the water is shortly heated to about 72°C., after which the wort is cooled to about 5°C. and the yeast is added.

3. A process according to claim 1 wherein the wort concentrate is obtained by mashing barley malt, subsequently adding hops or hop extract, filtering and concentrating same to at least 80% with exclusion of air, and racking same with exclusion of air.

4. A process according to claim 1 wherein for the production of the wort concentrate, the mash, after clarification, is mixed in a boiling state with hops and hop extract, boiled for an additional 60 to 90 minutes, cooled in a plate cooler, filtered with the addition of silicic acid and concentrated in vacuo.

5. A process according to claim 1 wherein the prepared fermentable wort is mixed with the yeast and subjected to an initial fermentation without pressure, and the partially attenuated wort is then fully attenuated.

6. A process according to claim 1 wherein the wort is fermented to about 50 to 60% of the extract after at least half of the required yeast has been added and the fermentation is then completed after addition of the remaining yeast.

7. A process according to claim 1 wherein, while the fermentation is taking place, yeast which has fermented is separated by centrifugation and is replaced with substitute yeast.

8. A process according to claim 1 wherein the separation of the yeast is begun while 10 to 20% of the extract is still unfermented, and the fermentation is completed during the separation of the yeast.

9. A process according to claim 1 wherein, after the yeast has been separated, the beer is cooled to −1.5° to −2.5°C. and is kept at said temperature for 1 to 2 days.

10. A process according to claim 1 wherein a separating agent is added to the beer to facilitate separation of the yeast and clarification of the beer.

11. A method as claimed in claim 1 wherein the steps are effected in succession to provide a continuous process for the preparation of the beer.

12. A process according to claim 1 comprising aerating the wort in the vessel by introducing air through nozzles in the bottom of the vessel.

13. A process according to claim 1 wherein said cooling chamber is provided with double walls with a space therebetween, and cooling of the chamber is effected by circulating a coolant through said space.

* * * * *